United States Patent
Kanafani et al.

(10) Patent No.: US 7,303,505 B2
(45) Date of Patent: Dec. 4, 2007

(54) METHOD FOR CONTROLLING RATE OF CHANGE OF RATIO IN A CONTINUOUSLY VARIABLE TRANSMISSION

(75) Inventors: Fadi S Kanafani, Windsor (CA); Jeremy M Smith, Farmington, MI (US); P. Brian McGrath, Chelsea, MI (US)

(73) Assignee: Chrysler LLC, Auburn Hills, MI (US)

( * ) Notice: Subject to any disclaimer, the term of this patent is extended or adjusted under 35 U.S.C. 154(b) by 229 days.

(21) Appl. No.: 11/303,390

(22) Filed: Dec. 16, 2005

(65) Prior Publication Data

US 2007/0142167 A1   Jun. 21, 2007

(51) Int. Cl.
*F16H 61/662* (2006.01)
(52) U.S. Cl. .............. 477/46; 477/37; 477/43; 477/54; 477/68; 477/107; 477/110
(58) Field of Classification Search .............. None
See application file for complete search history.

(56) References Cited

U.S. PATENT DOCUMENTS

| | | | | |
|---|---|---|---|---|
| 4,658,360 A | * | 4/1987 | Osanai et al. ........... | 701/62 |
| 4,817,469 A | * | 4/1989 | Shigematsu et al. ........ | 477/43 |
| 5,114,383 A | * | 5/1992 | Hirano et al. ............. | 474/18 |
| 6,066,070 A | * | 5/2000 | Ito et al. ................. | 477/43 |
| 2006/0035749 A1 | | 2/2006 | Kanafani et al. | |

* cited by examiner

*Primary Examiner*—David D. Le
(74) *Attorney, Agent, or Firm*—Thomas A. Jurecko

(57) ABSTRACT

A method for controlling a rate of change of speed ratios in a continuously variable transmission (CVT) includes sensing a vehicle speed, sensing an engine speed, and sensing a change in a position of an accelerator pedal. The method includes determining a desired engine speed based on the change in the position of the accelerator pedal, the vehicle speed, and the engine speed. The method includes increasing a target engine speed at a first rate to a predetermined value, wherein the target engine speed corresponds to a speed ratio. The method includes measuring a difference between the target engine speed that is held at the predetermined value and an actual engine speed, and increasing the target engine speed to the desired engine speed at a second rate when the difference substantially equals a predetermined threshold, wherein the second rate is less than the first rate.

6 Claims, 4 Drawing Sheets

METHOD FOR CONTROLLING RATE OF CHANGE OF RATIO IN A CONTINUOUSLY VARIABLE TRANSMISSION

FIELD OF THE INVENTION

The present invention relates to vehicle transmissions, and more particularly to methods for controlling rate of change of speed ratios in continuously variable transmissions.

BACKGROUND OF THE INVENTION

Unlike manual and automatic transmissions that provide discrete speed ratios, a continuously variable transmission (CVT) provides an uninterrupted range of speed ratios of engine speed to vehicle speed. When a driver requests more power by pressing down on a vehicle's accelerator pedal, the CVT changes the speed ratios at a very fast rate. The fast rate of change in the CVT causes excessive rise in engine speed and NVH (noise, vibration, and harshness) levels in the vehicle. Specifically, the excessive rise in engine speed is followed, after a short delay, by a sudden acceleration of the vehicle. This phenomenon is known as "Rubber-band Feel" and is undesirable.

SUMMARY OF THE INVENTION

A method for controlling a rate of change of speed ratios in a continuously variable transmission (CVT) comprises sensing a vehicle speed, sensing an engine speed, and sensing a change in a position of an accelerator pedal. A desired engine speed is determined based on the change in the position of the accelerator pedal, the vehicle speed, and the engine speed. A target engine speed is increased at a first rate to a predetermined value, wherein the target engine speed corresponds to a speed ratio. The target engine speed is held at the predetermined value. A difference between the held target engine speed and an actual engine speed is measured, and the target engine speed is increased to the desired engine speed at a second rate when the difference substantially equals a predetermined threshold, wherein the second rate is less than the first rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The problem of excessive rise in engine speed and NVH when a driver requests more power can be solved by controlling a rate of change of CVT ratio. The control is achieved by managing a change in an engine speed set-point or a target engine speed that corresponds to a desired CVT ratio. Specifically, engine speed is raised from a steady state to a desired final speed in three steps: (1) a "quick rise" step, wherein the set-point is quickly raised to a predetermined value; (2) a "hold" step, wherein the set-point is briefly held at the predetermined value; and (3) a "smooth rise" step, wherein the set-point is smoothly raised to the desired final speed.

Figure 1:
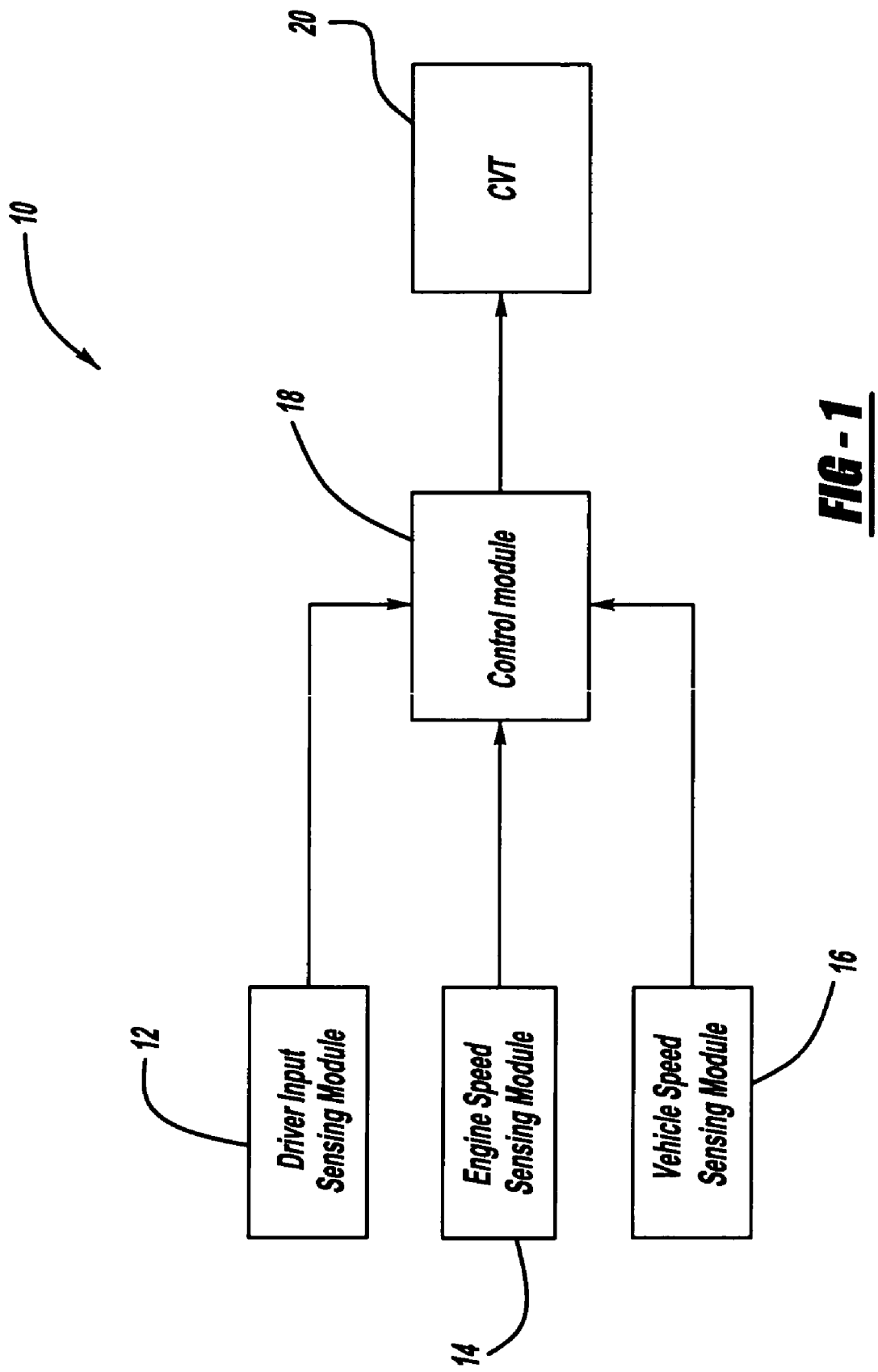
FIG. 1 is a block diagram of a system for controlling a rate of change of ratios in a CVT.

Referring now to FIG. 1, a system 10 for controlling a rate of change in a CVT 20 is shown. A driver input sensing module 12 determines a rate of change in accelerator pedal position. An engine speed sensing module 14 senses an engine speed. A vehicle speed sensing module 16 senses a vehicle speed. A control module 18 controls the rate of change of ratios in the CVT 20.

When a driver requests more power by pressing down on an accelerator pedal, the driver input sensing module 12 calculates a rate of change in pedal position. Based on the rate, the engine speed, and the vehicle speed, the control module 18 determines a desired engine speed that corresponds to the driver's request. The control module 18 determines the desired engine speed using a method disclosed in U.S. patent application Ser. No. 10/916,893, filed on Aug. 12, 2004 that is incorporated herein by reference in its entirety.

The control module 18 calculates a difference between the desired engine speed and a current engine speed. The control module 18 determines a rate of increase of engine speed that is necessary to attain the desired engine speed. If the rate of increase is greater than a predetermined threshold rate, the control module 18 quickly raises an engine speed set-point to a predetermined value. This value is between the current engine speed and the desired engine speed.

The control module 18 holds the set-point at the predetermined value. The CVT 20 responds to the rise in the set-point and increases the engine speed. The control module 18 monitors a difference between the held set-point and an actual engine speed. When the difference reaches a predetermined threshold, the control module 18 smoothly raises the set-point to the desired engine speed. The CVT 20 responds by smoothly increasing the engine speed to the desired engine speed.

Figure 2:
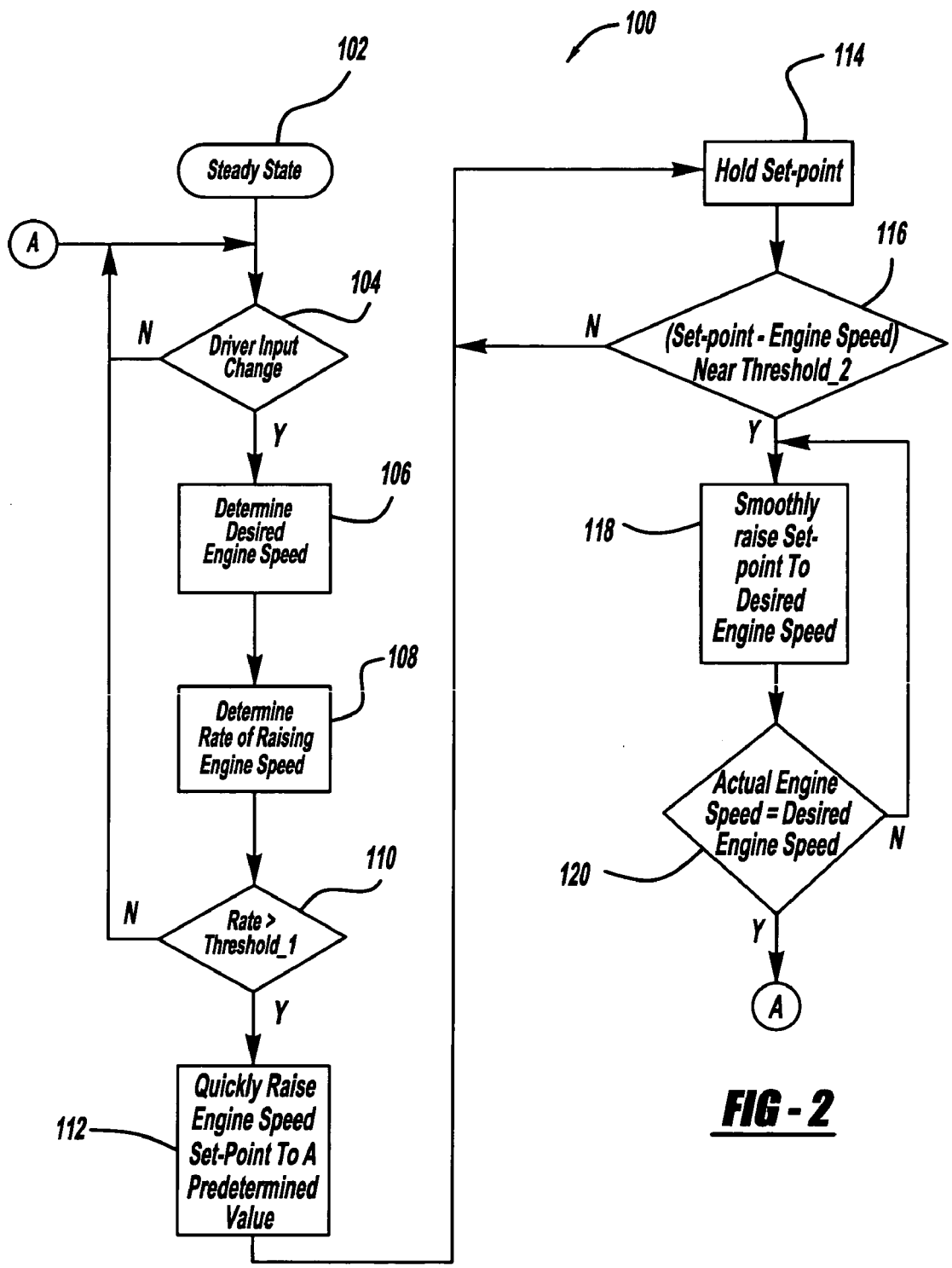
FIG. 2 is a flowchart of a method for controlling a rate of change of ratios in a CVT.
Figure 3:
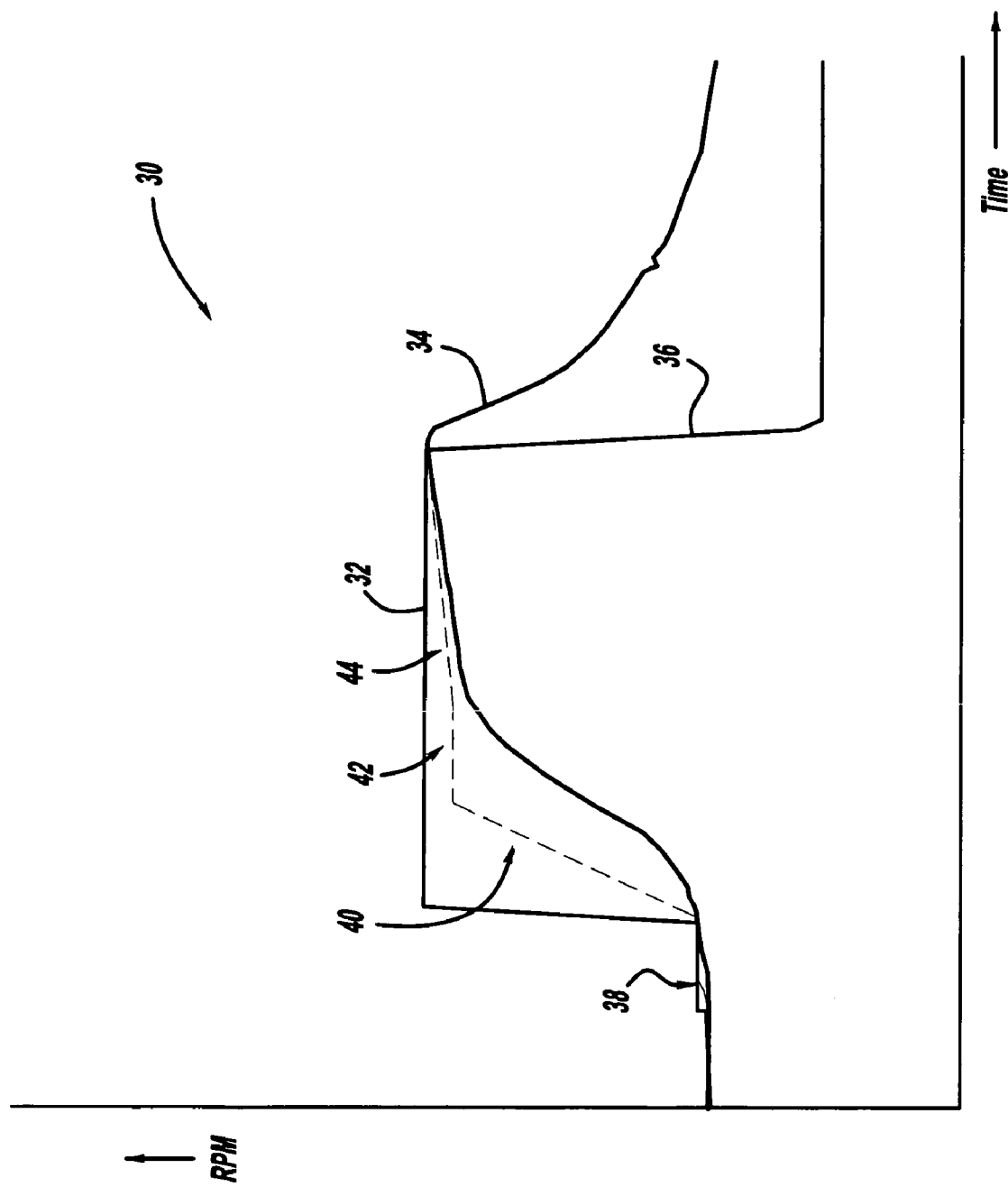
FIG. 3 is a graph of engine speed (RPM) as a function of time according to the present invention.

Referring now to FIGS. 2 and 3, a method 100 for controlling a rate of change in a CVT 20 is shown. In FIG. 3, a graph 30 of engine speed as a function of time is shown. Specifically, the graph 30 shows a relationship among a desired engine speed 32, an actual engine speed 34, and an engine speed 36 that is controlled according to the present invention. Additionally, the graph 30 illustrates four modes of operation of the method 100: Mode 1 is a steady state mode 38, Mode 2 is a quick rise mode 40, Mode 3 is a hold mode 42, and Mode 4 is a smooth rise mode 44.

In FIG. 2, the method 100 begins at step 102 wherein a vehicle is running at a relatively constant speed, and therefore the engine speed 36 is controlled in a steady state mode 38 as shown in FIG. 3. In step 104, the driver input sensing module 12 determines if a driver has changed a position of an accelerator pedal. If false, the method 100 continues in the steady state mode 38. If true, the control module 18 determines the desired engine speed 32 in step 106 that corresponds to the driver's input in step 104.

The control module 18 determines a rate of raising engine speed to attain the desired engine speed 32 in step 108. The control module 18 determines if the rate is greater than a predetermined threshold in step 110. If false, the control module 18 concludes that the driver's request is for a gradual change, and the method 100 continues in the steady state mode 38. If true, the method 100 switches from the steady state mode 38 to a quick rise mode 40 as shown in FIG. 3. The control module 18 quickly raises an engine speed set-point to a predetermined value in step 112.

In step 114, the method 100 enters a hold mode 42 as shown in FIG. 3, wherein the control module 18 holds the set-point at the predetermined value. The CVT 20 responds to the rise in the set-point by increasing the engine speed up to the set-point.

The control module 18 determines whether a difference between the set-point and the engine speed approaches a threshold value in step 116. If false, the control module 18 continues to hold the set-point at the predetermined value in step 114. The CVT continues to increase the engine speed. If true, the method 100 enters a smooth rise mode 44 as shown in FIG. 3.

The control module 18 smoothly raises the set-point to the desired engine speed in step 118. Accordingly, the CVT 20 gradually increases the engine speed. The control module 18 determines whether the engine speed has reached the desired engine speed in step 120. If false, the control module 18 continues to raise the set-point. The CVT 20 continues to increase the engine speed. If true, a steady state is reached, and the method 100 returns to step 104.

Figure 4:
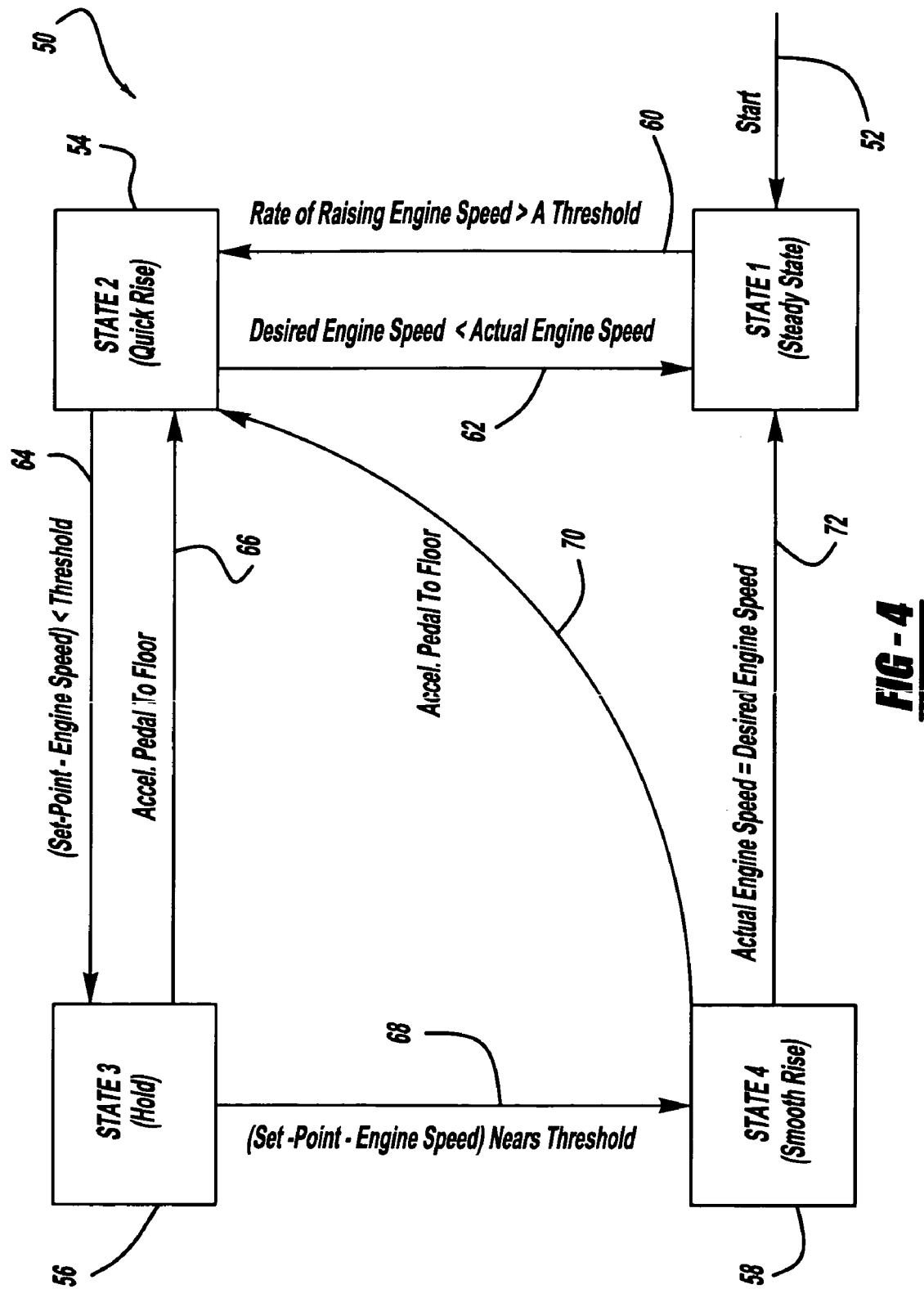
FIG. 4 is a state diagram for the present invention.

Referring now to FIG. 4, a state diagram for the present invention is shown. State 1 is a steady state 52 wherein a vehicle is running at a relatively constant speed. State 2 is a quick rise state 54 wherein a set-point for an engine speed of the vehicle is quickly raised to a predetermined value. State 1 transitions to State 2 as shown at 60 when a driver requests more power and a rate of raising an engine speed exceeds a predetermined threshold. State 2 transitions to State 1 as shown at 62 when the desired engine speed decreases and becomes less than the actual engine speed. This may happen, for example, when the driver "tips-out" or changes mind after initially requesting more power.

State 3 is a hold state 56 wherein the set-point is held at the predetermined value when a difference between the set-point and the engine speed is less than a threshold. State 2 transitions to State 3 as shown in 64 when the controlled speed attains a predetermined "target" value. State 3 transitions to State 2 as shown at 66 when the driver requests more power in addition to a prior request for more power. This may occur, for example, when the driver initially requests more power and subsequently floors the accelerator pedal.

State 4 is a smooth rise state 58 wherein the engine speed gradually increases from the held set-point value in State 3 to a desired engine speed that corresponds to the driver's request. State 3 transitions to State 4 as shown at 68 when the difference between the set-point and the engine speed approaches the threshold. State 4 transitions to State 2 as shown at 70 when the driver requests more power in addition to a prior request for more power. This may occur, for example, when the driver initially requests more power and subsequently floors the accelerator pedal. State 4 transitions to state 1 as shown at 72 when the engine speed equals the desired speed, and a steady state 52 is reached.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a rate of change of speed ratios in a continuously variable transmission (CVT), comprising:
    sensing a vehicle speed;
    sensing an engine speed;
    sensing a change in a position of an accelerator pedal;
    determining a desired engine speed based on said change in said position of said accelerator pedal, said vehicle speed, and said engine speed;
    increasing a target engine speed at a first rate to a predetermined value, wherein said target engine speed corresponds to a speed ratio;
    holding said target engine speed at said predetermined value;
    measuring a difference between said target engine speed that is held at said predetermined value and an actual engine speed; and
    increasing said target engine speed to said desired engine speed at a second rate when said difference substantially equals a predetermined threshold, wherein said second rate is less than said first rate.

2. The method of claim 1 further comprising determining a rate of change of engine speed necessary to attain said desired engine speed.

3. The method of claim 1 further comprising increasing said target engine speed to said predetermined value if a rate of change of engine speed necessary to attain said desired engine speed exceeds a predetermined rate.

4. A system for controlling a rate of change of speed ratios in a continuously variable transmission (CVT), comprising:
    a first sensing module that senses a vehicle speed;
    a second sensing module that senses an engine speed;
    a third sensing module that senses a change in a position of an accelerator pedal; and
    a control module that:
        determines a desired engine speed based on said change in said position of said accelerator pedal, said vehicle speed, and said engine speed;
        increases a target engine speed at a first rate to a predetermined value, wherein said target engine speed corresponds to a speed ratio;
        holds said target engine speed at said predetermined value;
        measures a difference between said target engine speed that is held at said predetermined value and an actual engine speed; and
        increases said target engine speed to said desired engine speed at a second rate when said difference substantially equals a predetermined threshold, wherein said second rate is less than said first rate.

5. The system of claim 4 wherein said control module determines a rate of change of engine speed necessary to attain said desired engine speed.

6. The system of claim 4 wherein said control module increases said target engine speed to said predetermined value if a rate of change of engine speed necessary to attain said desired engine speed exceeds a predetermined rate.

* * * * *